US012506318B2

(12) United States Patent
Fujimoto et al.

(10) Patent No.: US 12,506,318 B2
(45) Date of Patent: Dec. 23, 2025

(54) ULTRAVIOLET LASER APPARATUS (71) Applicant: KIMMON KOHA CO., LTD., Tokyo (JP)

(72) Inventors: Yasushi Fujimoto, Chiba (JP); Paul Binun, Tokyo (JP); Shinji Motokoshi, Osaka (JP); Masamori Nakahara, Tokyo (JP); Takeshi Hamada, Tokyo (JP)

(73) Assignee: KIMMON KOHA CO., LTD., Tokyo (JP)

( * ) Notice: Subject to any disclaimer, the term of this patent is extended or adjusted under 35 U.S.C. 154(b) by 761 days.

(21) Appl. No.: 17/881,856

(22) Filed: Aug. 5, 2022

(65) Prior Publication Data

US 2022/0385025 A1 Dec. 1, 2022

Related U.S. Application Data (63) Continuation of application No. PCT/JP2020/027999, filed on Jul. 20, 2020.

(30) Foreign Application Priority Data

Feb. 12, 2020 (JP) ................. 2020-021206

(51) Int. Cl.
*H01S 3/081* (2006.01)
*H01S 3/067* (2006.01)
(Continued)

(52) U.S. Cl.
CPC ........ *H01S 3/0816* (2013.01); *H01S 3/06716* (2013.01); *H01S 3/082* (2013.01);
(Continued)

(58) Field of Classification Search
CPC ............... H01S 3/0941–09415; H01S 3/094003–094023; H01S 3/109; H01S 3/0092; H01S 3/082; H01S 3/10076
See application file for complete search history.

(56) References Cited

U.S. PATENT DOCUMENTS 4,233,571 A * 11/1980 Wang .................... G02F 1/3538
372/98
4,493,086 A * 1/1985 Jain ...................... H01S 3/10076
372/99
(Continued)

FOREIGN PATENT DOCUMENTS

EP 4106116 A1 12/2022
JP H04-134432 A 5/1992
(Continued)

OTHER PUBLICATIONS

Yasuhiro Fujimoto, "Development on High Power Visible Fiber Lasers Based on Waterproof Fluoride Glass" Optics, Mar. 2016, vol. 45, No. 3, pp. 87-93 (8 pages).
(Continued)

*Primary Examiner* — Joshua King
(74) *Attorney, Agent, or Firm* — Osha Bergman Watanabe & Burton LLP (57) ABSTRACT

An ultraviolet laser apparatus includes: a semiconductor laser that emits an excitation laser light; a fiber laser medium to which the excitation laser light enters from the semiconductor laser and that causes laser oscillation; and an external resonator that: converts a wavelength of a laser light oscillated in the fiber laser medium, and outputs an ultraviolet region continuous wave of at least 0.1W.

6 Claims, 4 Drawing Sheets

(51) Int. Cl.

| | |
|---|---|
| *H01S 3/082* | (2006.01) |
| *H01S 3/094* | (2006.01) |
| *H01S 3/0941* | (2006.01) |
| *H01S 3/10* | (2006.01) |
| *H01S 3/109* | (2006.01) |
| *H01S 3/13* | (2006.01) |
| *H01S 3/16* | (2006.01) |
| *H01S 3/17* | (2006.01) |

(52) U.S. Cl.
CPC .. *H01S 3/094003* (2013.01); *H01S 3/094053* (2013.01); *H01S 3/09415* (2013.01); *H01S 3/10076* (2013.01); *H01S 3/109* (2013.01); *H01S 3/1305* (2013.01); *H01S 3/1307* (2013.01); *H01S 3/1613* (2013.01); *H01S 3/0941* (2013.01); *H01S 3/173* (2013.01); *H01S 2302/00* (2013.01)

(56) References Cited

U.S. PATENT DOCUMENTS

| | | | | |
|---|---|---|---|---|
| 5,367,527 | A * | 11/1994 | Gruneisen | H01S 3/2383 372/18 |
| 11,621,535 | B2 * | 4/2023 | Fujimoto | G02B 6/4272 372/6 |
| 12,184,032 | B2 * | 12/2024 | Fujimoto | H01S 3/1613 |
| 2002/0171912 | A1 * | 11/2002 | Masuda | G02F 1/3532 359/240 |
| 2009/0046351 | A1 * | 2/2009 | Tamaki | G02F 1/37 359/326 |
| 2009/0067035 | A1 * | 3/2009 | Foster | G02F 1/3551 359/328 |
| 2018/0188633 | A1 | 7/2018 | Chuang et al. | |
| 2022/0102933 | A1 | 3/2022 | Fujimoto et al. | |

FOREIGN PATENT DOCUMENTS

| | | | | |
|---|---|---|---|---|
| JP | H04-342182 | A | | 11/1992 |
| JP | 2002-311467 | A | | 10/2002 |
| JP | 2006-019603 | A | | 1/2006 |
| JP | 2010-224303 | A | | 10/2010 |
| JP | 2012-27215 | A | | 2/2012 |
| JP | 2012027215 | A | * | 2/2012 |
| JP | 2012-177806 | A | | 9/2012 |
| JP | 2015065189 | A | * | 4/2015 |
| JP | 2015-170795 | A | | 9/2015 |
| JP | 2017-502504 | A | | 1/2017 |
| KR | 20170063636 | A | * | 6/2017 ............ H01S 3/109 |
| WO | 2015/174388 | A1 | | 11/2015 |
| WO | 2018/146924 | A1 | | 8/2018 |

OTHER PUBLICATIONS

Notice of Reasons for Refusal issued in corresponding Japanese Application No. 2020-021206 mailed Jul. 13, 2021 (6 pages).
Kunio Yoshida and Eiji Yoshida "Renaissance of YAG laser construction method", Laser Research vol. 21 No. 8 pp. 8 to 15, Aug. 1993 (8 pages).
Takashige Omatsu, "Beam quality control for a high output semiconductor laser using a photo-refractive phase conjugate mirror", Laser Research vol. 30 No. 4 pp. 177 to 181, Apr. 2002 (5 pages).
Eiji Yoshida, "Research for high performance of solid laser with high average output", pp. 164 to 165, Jan. 1999 (2 pages).
International Search Report issued in corresponding International Application No. PCT/JP2020/027999 mailed Oct. 20, 2020 (7 pages).
Written Opinion issued in corresponding International Application No. PCT/JP2020/027999 mailed Oct. 20, 2020 (5 pages).
Fischer, Baruch, et al., "Photorefractive Oscillators," IEEE Journal of Quantum Electronics, vol. 25, No. 3, XP011478602, Mar. 1989 (20 pages).
Extended European Search Report issued in corresponding European Patent Application No. 20918370.6, dated Jul. 3, 2023 (9 pages).

* cited by examiner

ULTRAVIOLET LASER APPARATUS

BACKGROUND

Technical Field

The present invention relates to an ultraviolet laser apparatus to output an ultraviolet laser light.

Description of Related Art

Conventionally, an ultraviolet laser apparatus has been used as a laser light source of a 3D printer for light shaping system, a laser marker of ultraviolet light and the like. As such ultraviolet laser apparatus, under the present circumstances, a He—Cd laser apparatus (oscillation wavelength of 325 nm) and a YAG laser apparatus (oscillation wavelength of 355 nm) have been used.

Patent Literature 1 discloses an ultraviolet laser apparatus including a laser light source to generate a fundamental wave light and a wavelength converting crystal to convert in wavelength at least one of the fundamental wave light and its high harmonic wave light as an entering light to an ultraviolet laser light, wherein a reflective surface for transmitting at least one of at least one of the fundamental wave light and the high harmonic wave light, and the ultraviolet laser light, and reflecting the other, is formed in the inside of the wavelength converting crystal in a direction inclining to the optical axis of at least one of the fundamental wave light and the high harmonic wave light (claim 1).

Patent Literature

Patent Literature 1: JP 2012-177806A

The He—Cd laser apparatus is a large size, and in order to obtain an output of 50 mW, the apparatus case involves, for example, a size of about 146×197×1400 mm, and its efficiency does not fulfill 0.01%. Moreover, since the cadmium raw material evaporates, it is absolutely necessary to perform maintenance one time per year due to short life of the laser tube.

In the YAG laser apparatus, since its oscillation wavelength is in a near-infrared region, in order to obtain ultraviolet light, it is necessary to perform wavelength conversion with the use of nonlinear optical crystal at least two times. The number of times of wavelength conversion directly leads to an increase of elements in the apparatus and the costs, and causes to lower the output stability and the beam quality. For the reasons mentioned above, the ultraviolet laser apparatus is desired to attain miniaturization and to have high luminance, high efficiency and long life.

The ultraviolet laser apparatus in Patent Literature 1 includes the wavelength converting crystal to convert wavelength of an entering light to the ultraviolet region wavelength. The wavelength converting crystal needs to have a reflective surface inclining to the optical axis in the inside. Since the reflective surface is constituted by plural optical members, the constitution of the wavelength converting crystal becomes complex.

SUMMARY

One or more embodiments of the present invention provide an ultraviolet laser apparatus that attains miniaturization and has high luminance, high efficiency and long life.

The present inventors have examined diligently the following matters and have reached the present invention.

(1) High output and high beam quality are required in order to realize high luminance, and it is optimal to use a fiber laser. However, the oscillation wavelength becomes near-infrared in the fiber laser in which a base material composed of common silica glass is doped with rare earth element. Then, in order to make the oscillation wavelength an ultraviolet light, it becomes necessary to perform wavelength conversion two times, which may lower an efficiency or a beam quality.

(2) In order to raise the efficiency, it may be considered to use a fiber laser having an oscillation wavelength in a visible region, its base material being composed of fluoride. The efficiency increases with such fluoride fiber laser, since an ultraviolet light is obtained by performing wavelength conversion one time.

(3) In order to excite a fiber laser efficiently, outputs of two semiconductor lasers may be synthesized, transmitted by optical transmission using an optical fiber, and combined with a fiber laser.

(4) In the case that the temperature of the fiber itself rises with high output, an output will saturate and lower further. On the contrary, by using a metal material having a coefficient of linear expansion near that of a fiber material for a housing and a ferrule, the heat of the fiber can be radiated efficiently. Accordingly, the excitation output can be raised, and the saturation reduction of the output is reduced.

(5) By utilizing a nonlinear optical crystal having a high harmonic wave generating function in an external resonator as a fundamental wave resonator mirror, the alignment becomes free and the output stability improves.

An ultraviolet laser apparatus, to which one aspect of the present invention is reflected, includes a semiconductor laser for excitation, a fiber laser medium to which an excitation laser light enters from the semiconductor laser for excitation such that laser oscillation is conducted, and an external resonator for wavelength conversion to perform wavelength conversion of a laser light oscillated in the fiber laser medium, wherein the ultraviolet laser apparatus outputs an ultraviolet region continuous wave of at least 0.1 W from the external resonator for wavelength conversion.

According to the ultraviolet laser apparatus, the fiber laser medium conducts laser oscillation by the excitation laser light from the semiconductor laser for excitation, and the external resonator for wavelength conversion performs wavelength conversion of the oscillated laser light, thereby to output the ultraviolet region continuous wave of at least 0.1 W. Accordingly, it becomes possible to realize the ultraviolet laser apparatus that attains miniaturization and has high luminance, high efficiency, and a long life.

In the above-described ultraviolet laser apparatus, the oscillation wavelength of the semiconductor laser for excitation may be 445±5 nm and the fiber laser medium may be composed of a fluoride material added with praseodymium (Pr). With this, an ultraviolet laser light can be obtained by performing wavelength conversion one time, and the efficiency improves.

The external resonator for wavelength conversion may include one nonlinear optical crystal that serves as both a high harmonic wave generating function for wavelength conversion and a phase conjugate mirror, a plurality of high reflectivity mirrors, and a feedback mechanism for phase control. The nonlinear optical crystal also serves as the phase conjugate mirror, whereby it becomes alignment free, the alignment adjustments of an optical axis and the like in the apparatus becomes unnecessary or easy, and the output stability of the laser light improves. Moreover, the output stability of the laser light relative to change of environment such as outside air temperature can improve by the feedback mechanism for phase control.

An optical fiber may be provided for performing optical transmission between the semiconductor laser for excitation and the fiber laser medium. With this, the optical transmission from the semiconductor laser for excitation to the fiber laser medium can be performed efficiently.

There may be provided a ferrule inserted into or attached to an end portion or end of the fiber laser medium, and a housing that accommodates the fiber laser medium and supports the fiber laser medium with the ferrule, wherein each of the housing and the ferrule is constituted by or composed of a metal material with a thermal expansion coefficient approximate to (i.e., either equal to or having a predetermined difference from) a thermal expansion coefficient of the raw material of the fiber laser medium. With this, the heat of the fiber laser medium can be radiated efficiently, whereby the excitation output can be raised. Successively, the saturation reduction of the output can be reduced, and the output of high efficiency can be realized.

The above-described ultraviolet laser apparatus can generate the ultraviolet laser light with wavelength of 320 nm or less.

According to the present invention, it is possible to realize an ultraviolet laser apparatus that attains miniaturization and has high luminance, high efficiency, and a long life.

BRIEF DESCRIPTION OF DRAWINGS

FIGS. 2A-2B FIG. 2A is a front view showing schematically a housing that accommodates a fluoride fiber shown in FIG. 1.

DETAILED DESCRIPTION OF EMBODIMENTS

Figure 1:
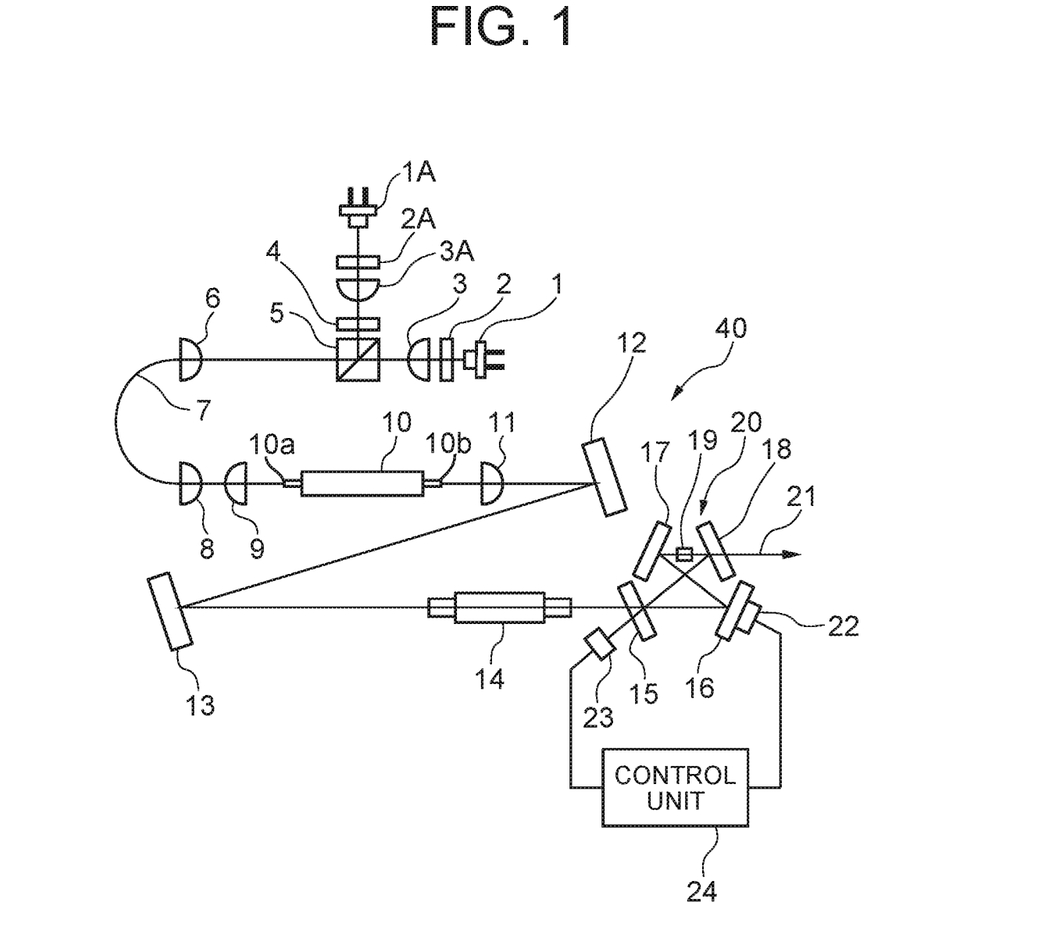
FIG. 1 is an optical path diagram showing a schematic configuration of an ultraviolet laser apparatus according to one or more embodiments.
Figure 2A:
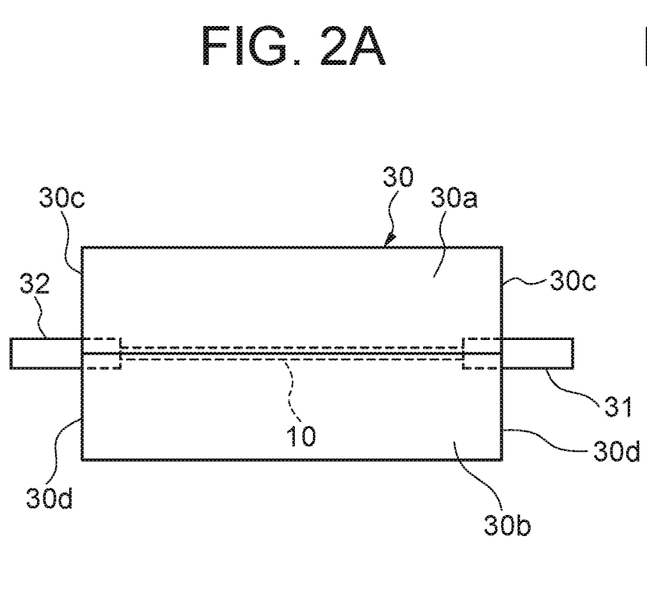
Figure 2B:
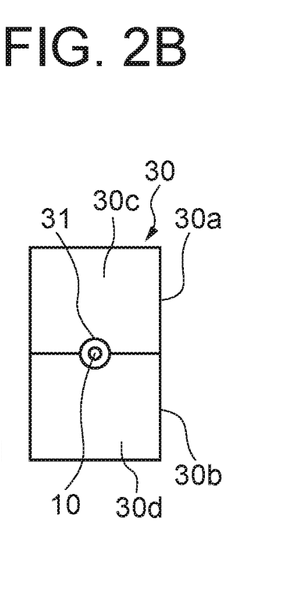
FIG. 2B is a side view showing schematically the housing.
Figure 3:
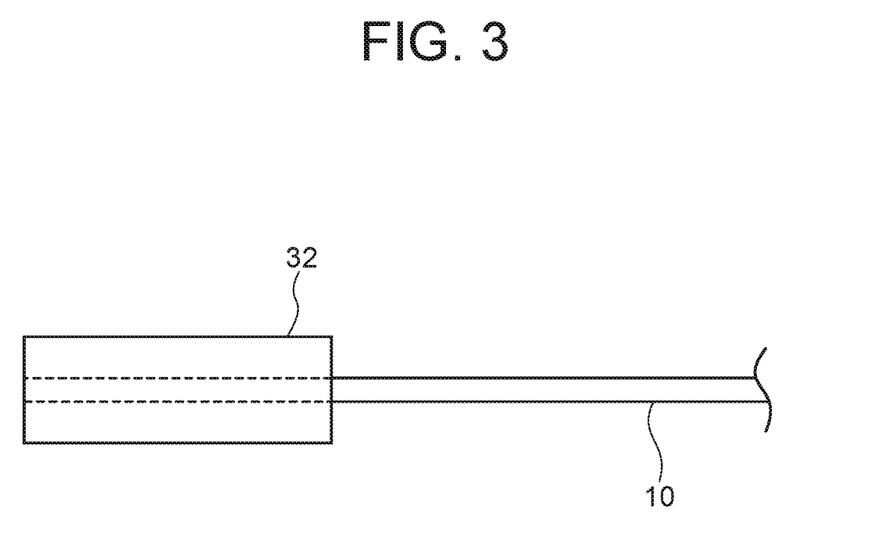
FIG. 3 is an illustration showing a ferrule attached to an end of the fluoride fiber shown in FIG. 2A.

Hereinafter, embodiments for executing the present invention will be described with use of drawings. FIG. 1 is an optical path diagram showing a schematic configuration of an ultraviolet laser apparatus according to one or more embodiments. FIG. 2A is a front view showing schematically a housing that accommodates a fiber shown in FIG. 1, and FIG. 2B is a side view showing schematically the housing. FIG. 3 is an illustration showing a ferrule attached to an end of the fiber shown in FIG. 2A.

As shown in FIG. 1, an ultraviolet laser apparatus 40 according to one or more embodiments includes a fluoride fiber (fiber laser medium) 10 that oscillates a fundamental wave laser light of visible light, semiconductor lasers 1 and 1A for excitation each of which generates a laser light (wave length of 441 nm) that excites the fluoride fiber 10, and an external resonator 20 that changes a wavelength (637 nm) of a fundamental wave laser light into an ultraviolet region wavelength. The ultraviolet laser apparatus 40 outputs an ultraviolet laser light with an oscillation wavelength of 318 nm. According to one or more embodiments, it is possible to realize an ultraviolet laser apparatus that attains miniaturization and has high luminance, high efficiency, and long life.

In order to attain high output, each laser light of the two semiconductor lasers 1 and 1A is collimated by lenses 2, 2A of a long axis direction and lenses 3, 3A of a short axis direction, and the two laser lights are synthesized with polarization by a polarization beam splitter 5 and made into an excitation laser light of a single beam. Such excitation laser light is collected to a quartz fiber 7 by a light collecting lens 6 with aspheric surface. Successively, after being emitted from the quartz fiber 7, the excitation laser light is collimated by a lens 8 and is collected and input into a clad of a fluoride fiber 10 by a light collecting lens 9, thereby to perform transmission of the excitation laser light to the fluoride fiber 10. By such an optical structure, an optical transmission loss can be reduced and it is possible to input 80% or more of each laser light of the semiconductor lasers 1, 1A into the fluoride fiber 10. A wavelength plate 14 is disposed on the semiconductor laser 1A side. Note that the lenses 2, 2A, 3, and 3A may be a suitable combination of a collimate lens and an anamorphic prism pair. Also, the polarization beam splitter 5 may be a suitable polarization filter.

The transmission of the excitation laser light to the fluoride fiber 10 is performed through the quartz fiber 7. The transmission of the excitation laser light may be performed with use of spatial coupling that does not rely on an optical fiber, but an excitation beam pattern is homogenized by making the excitation laser light pass through the optical fiber as mentioned above, which can reduce damages due to excitation. Even if using a beam homogenizing technique such as a random phase plate by making an excitation light into a spatial light, this matter is essentially the same.

As the fluoride fiber, there is one in which ZBLAN, or $ZrF_4$ and $YF_3$ are main component. Although one in which $AlF_3$ is utilized as main component is a fluoride glass, it has realized improvement in weatherability (especially water resistance), and hence the fluoride fiber 10 in which $AlF_3$ is main component may be used. Moreover, in order to miniaturize the apparatus, as the fluoride fiber 10, a gain fiber is used in which high-concentration active elements (rare earth elements, transition elements etc., or rare earth ions (Yb, Nd, Er, Pr, Dy, Ce, Tb, etc.)) are added, whereby sufficient fundamental wave output can be obtained with a fiber length of 30 cm or less. In this connection, an antireflection film that transmits an excitation laser light and a high reflection film that reflects a fundamental wave laser light are formed on an input-side end face 10a of the fluoride fiber 10. An antireflection film that transmits a fundamental wave laser light and a high reflection film that reflects an excitation laser light are formed on an output-side end face 10b of the fluoride fiber 10. As materials of the antireflection films and the high reflection films mentioned above, for example, it is possible to use $TiO_2$, $Ta_2O_5$, $Al_2O_3$, $SiO_2$, $MgF_2$, and $HfO_2$.

In order to prevent saturation of the fundamental wave output due to temperature rise of the fluoride fiber 10 by excitation, as shown in FIG. 2A, FIG. 2B and FIG. 3, ferrules 31 and 32 made of metal are attached onto both ends of the fluoride fiber 10. Also, metal having high heat dissipation effect is used for a housing 30 for the fluoride fiber 10 to suppress the temperature rise in the fiber. Such configuration has been proposed previously by the present inventors with Japanese Patent Application No. 2019-138108.

As shown in FIG. 2A and FIG. 2B, the ferrules 31 and 32 are bonded respectively to each end of the fluoride fiber 10, and the ferrules 31 and 32 and the fluoride fiber 10 are accommodated in the housing 30 in a state that the ferrules 31 and 32 are brought in contact with side plates 30c, 30d on both sides of the housing 30 by using thermally conductive paste to suppress thermal resistance as much as possible. The housing 30 has a structure divided into two halves of upper and lower portions as shown in FIG. 2A and FIG. 2B. When the upper portion 30a and the lower portion 30b are brought in contact with each other, the ferrules 31, 32 are located at semicircular notch portions formed on each of the side plates 30c, 30d and are supported so as to be sandwiched between the semicircular notch portions. As shown in FIGS. 2A-2B and FIG. 3, the fluoride fiber 10 is inserted into each through hole of the ferrules 31, 32 with application of an adhesive.

The ferrules 31, 32 are constituted with a metal (for example, copper, aluminum, stainless steel, nickel, an alloy of them, or the like) that is high thermally-conductive material, whereby it is possible to realize (1) efficient heat conduction through ends of the fiber, (2) protection of the fiber ends that are broken easily because of being thin and weak in mechanical strength, (3) facilitation of polishing work of the fiber end faces, and (4) facilitation of formation of a dielectric coating film onto the fiber end faces.

Also, the housing 30 is constituted with a metal material (for example, copper, aluminum, stainless steel, nickel, an alloy of them, etc.) that is high thermally-conductive material, thereby to conduct the heat generated in the fluoride fiber 10 efficiently through the ferrules 31, 32 that is in contact with the side plates 30c, 30d of the housing 30 in a state that thermal resistance is suppressed as much as possible, and to radiate the heat. For this reason, the housing 30 functions also as a radiator. The heat radiated from the housing 30 is discharged through a Peltier element and the like provided in the housing 30, whereby the heat accumulated in the fluoride fiber 10 can be discharged effectively.

Moreover, the housing 30 and the ferrules 31, 32 are constituted by the material having a thermal expansion coefficient that coincides with or approximates to that of the raw material of the fluoride fiber 10, thereby to prevent breakage of a fiber end surface or a dielectric multilayer film coating surface due to a difference in thermal expansion coefficient caused by heat accumulation at the time of high output operation of the apparatus.

As mentioned above, the materials that respectively constitute the housing 30 and the ferrules 31, 32 have thermal expansion coefficient approximating to that of the raw material of the fluoride fiber 10 and high heat conductivity, thereby to avoid aforementioned issues caused by heat accumulation of the fiber.

A lens 11 is disposed in an output side of the fluoride fiber 10 and is configured to collimate a fundamental wave laser light output from the fluoride fiber 10. Then, the fundamental wave laser light enters a matching lens 14 disposed in front of the external resonator 20 through mirrors 12, 13, and then, enters an external resonator 20. The matching lens 14 is constituted by combining lenses in order to match the fundamental wave laser light with the mode in the external resonator 20.

The external resonator 20 constitutes a resonator for wavelength conversion with mirrors 15 to 18 and includes a nonlinear optical crystal 19 that is disposed between the mirrors 17 and 18 and has a high harmonic wave generating function for wavelength conversion. The nonlinear optical crystal 19 also functions as a phase conjugate mirror, whereby the wavelength conversion output is stabilized and higher than the time of using a fundamental wave resonator and an external resonator, without using an emission mirror of the fundamental wave, the ultraviolet laser light of high output can be obtained. The nonlinear optical crystal 19 does not require such a reflective surface at inside as Patent Literature 1, and involves simple constitution. The mirrors 15 to 18 have a high reflectance of 99.9% or more relative to the wavelength of the fundamental wave laser light.

The nonlinear optical crystal 19 functions as a phase conjugate mirror, whereby a phase conjugate wave generated in the nonlinear optical crystal 19 travels exactly along a reverse optical path of the laser light entering the nonlinear optical crystal 19 to return to or reach the end face of the fluoride fiber 10 which is a laser medium. The excitation laser light enters the end face and the laser light is reflected on the end face. For this reason, the nonlinear optical crystal 19 functioning as the phase conjugate mirror and the fluoride fiber 10 face to each other automatically and passively, thereby to cause laser resonation and to result in laser oscillation. The wavelength and phase of the fundamental wave laser light thus laser-oscillated are locked passively, whereby complex alignment adjustments of the optical axis and the like become unnecessary and the output stability improves. Moreover, a second high harmonic wave is generated by the nonlinear optical crystal 19 and is emitted from the mirror 18 along an optical path 21 to the outside, whereby a laser light of an ultraviolet region by the second high harmonic wave is output. In this way, it is possible to obtain simply and stably the laser lights in the visible region and in the ultraviolet region with high output. Such a configuration has been proposed previously by the present inventors with Japanese Patent Application No. 2019-127329.

Also, as shown in FIG. 1, the external resonator 20 is equipped with a feedback mechanism for phase control that includes a piezo element 22, a light receiving unit 23, and a control unit 24 comprising a central processing unit (CPU), and that controls a phase of the laser light. The mirror 15 is configured to transmit a part of a reflected light from the mirror 18. The light receiving unit 23 is configured to receive the partial transmitted light. The resonator length of the ring resonator 20 requires to be a multiple of the fundamental wave wavelength. For such a requirement, by using a Pound-Drever-Hall method, a Hansch-Couillaud method, and the like, a difference in polarization of the fundamental wave in the ring resonator 20 is measured. Based on the measurement result, the control unit 24 sends electric signal to the piezo element 22, and the piezo element 22 drives the mirror 16 so as to control the resonator length to become constant, whereby the wavelength conversion output is stabilized relative to a change of environment such as outside temperature.

EXAMPLE

Next, the ultraviolet laser apparatus according to one or more embodiments shown in FIG. 1 to FIG. 3 will be described more concretely as an example. However, the present invention should not be limited to such an example.

The two semiconductor lasers 1 and 1A for excitation that constitute an oscillator unit in the ultraviolet laser apparatus of the example have an oscillation wavelength of 441 nm and a rated output of 3.5 W and are attached to a block made of copper. In order to stabilize the output and excitation wavelength, the semiconductor lasers 1, 1A are temperature-controlled with a Peltier device.

The excitation laser light is transmitted to the fluoride fiber 10 by the quartz fiber 7 having core diameter of 20 μm.

In the case that the core diameter of the quartz fiber 7 can be adjusted to the clad NA in the fluoride fibers 10, the core diameter may be within a range of 15 to 50 μm, especially may be 15, 30, 40 or 50 μm.

The fluoride fiber 10 is constituted by an optical fiber that is doped with Pr (praseodymium) at 3000 ppm and has an overall length of 17 cm. In order to stabilize the output, the temperature of the housing 30 of the fluoride fiber 10 is controlled to constant temperature of 25° C. by a Peltier element. The addition concentration of Pr and the fiber overall length may be adjusted in response to a request based on the design of the whole apparatus. The addition concentration is adjusted between 1000 and 5000 ppm, and the fiber length is adjusted within a range of 10 to 30 cm, especially to 10, 15, 17, 20, 25, or 30 cm.

In the fluoride fiber 10, the ferrules 31, 32 made of metal are bonded on both ends, the end faces are polished, and then an antireflection film and a high reflection film are vapor-deposited to the end faces. Also, in order to reduce heat accumulation caused by excitation light in the fluoride fiber 10, copper is used for the housing 30 that accommodates the fluoride fiber 10, and nickel is used for the ferrules 31, 32 of the fluoride fiber 10. The respective thermal conductivities of the fluoride fiber 10, nickel, and copper are 0.898 W/mK, 91 W/mK, and 403 W/mK. Moreover, the respective linear expansion coefficients of the fluoride fiber 10, nickel, and copper are $18.6 \times 10^{-6}$/K, $13.4 \times 10^{-6}$/K, and $16.5 \times 10^{-6}$/K.

The external resonator 20 includes a bow-tie type ring resonator by the four mirrors 15 to 18 and the wavelength converting crystal (nonlinear optical crystal) 19 composed of BBO ($\beta$-BaB$_2$O$_4$). The mirrors 15 to 18 are attached to respective mirror holders, and each of the mirror holders includes an adjustment mechanism for adjusting X and Y directions (angle adjustment). The wavelength converting crystal 19 is attached to a holder which includes an adjustment mechanism for adjusting a position and rotation (left, right, upper and lower).

Figure 4:
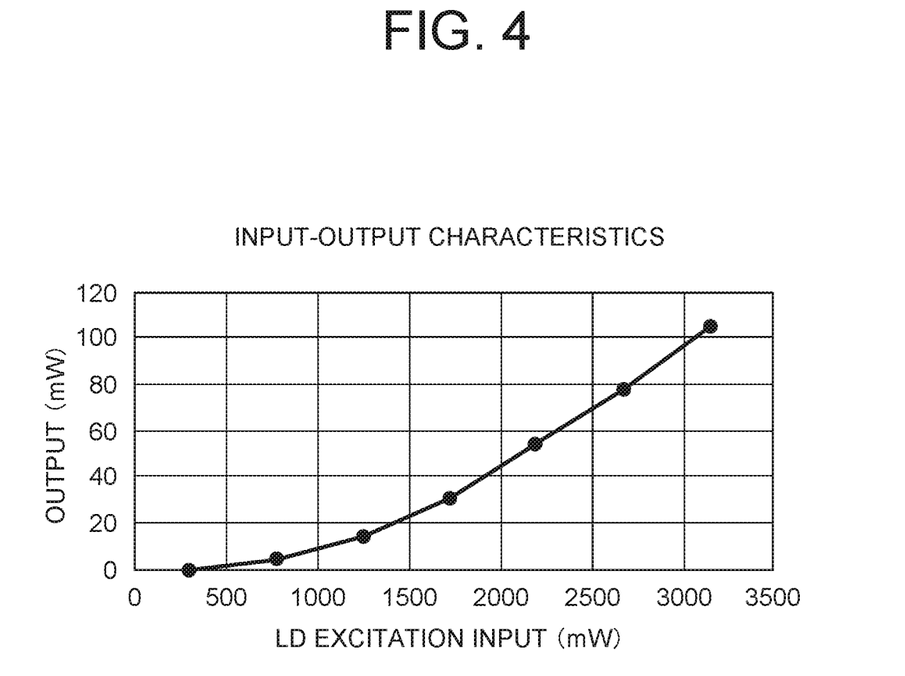
FIG. 4 is a graph showing input-output characteristics of the ultraviolet laser apparatus shown in FIG. 1 according to an example of one or more embodiments.

According to the ultraviolet laser apparatus of the example, the size of an oscillation unit became 175 mm in width, 360 mm in depth, and 106 mm in height, whereby the miniaturization could be attained. As the input and output characteristics shown in FIG. 4, a continuous wave ultraviolet laser light with an oscillation wavelength of 318 nm and 0.1 W or more could be output by the two semiconductor lasers (LD) of a rated power of 3.5 W and 442 nm.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the constitution of the ultraviolet laser apparatus shown in FIG. 1 is one case, and it is needless to say that other constitution may be permissible.

As the material that constitutes the ferrules 31, 32 and the housing 30 shown in FIGS. 2A-2B and FIG. 3, as long as other materials have a thermal expansion coefficient approximating to the thermal expansion coefficient of a fiber and a high heat conductivity of, for example, 90 W/mK or more, the other materials may be used.

The nonlinear optical crystals 19 shown in FIG. 1 may be an optical material other than BBO ($\beta$-BaB$_2$O$_4$), for example, may be LBO (LiB$_3$O$_5$) and CLBO (CsLiB$_6$O$_{10}$).

INDUSTRIAL APPLICABILITY

According to the present invention, because the ultraviolet laser apparatus that attains miniaturization and has high luminance, high efficiency, and long life, can be realized, it is possible to provide the ultraviolet laser apparatus that is easier to use and suppress the cost less than the conventional He—Cd laser apparatus and YAG laser apparatus.

REFERENCE SIGNS LIST 1 and 1A semiconductor laser
5 polarization beam splitter
7 quartz fiber
10 fluoride fiber
14 matching lens
15 to 18 mirror
19 nonlinear optical crystal (wavelength converting crystal)
20 external resonator
30 housing
31, 32 ferrule
40 ultraviolet laser apparatus

What is claimed is:

1. An ultraviolet laser apparatus, comprising:
a semiconductor laser that emits an excitation laser light;
a fiber laser medium to which the excitation laser light enters from the semiconductor laser and that causes laser oscillation; and
an external resonator that converts a wavelength of a laser light oscillated in the fiber laser medium, wherein
the external resonator comprises:
one nonlinear optical crystal that has a higher harmonic wave generating function for converting the wavelength and also functions as a phase conjugate mirror;
a plurality of high reflectivity mirrors; and
a feedback mechanism that controls a phase of the laser light,
once the laser light enters the external resonator, the phase conjugate mirror reflects the laser light and the reflected light travels along a reverse optical path to reach an end face of the fiber laser medium, the excitation laser light entering the end face and the laser light being reflected on the end face, such that the fiber laser medium and the phase conjugate mirror cause the laser oscillation and the nonlinear optical crystal generates a higher harmonic wave of the laser light by the laser oscillation, and
the external resonator outputs an ultraviolet region continuous wave of at least 0.1 W.

2. The ultraviolet laser apparatus according to claim 1, wherein
an oscillation wavelength of the semiconductor laser is 445±5 nm, and
the fiber laser medium is composed of a fluoride material added with praseodymium (Pr).

3. The ultraviolet laser apparatus according to claim 1, wherein the nonlinear optical crystal is BBO ($\beta$-BaB$_2$O$_4$), LBO (LiB$_3$O$_5$), or CLBO (CsLiB$_6$O$_{10}$).

4. The ultraviolet laser apparatus according to claim 1, further comprising:
an optical fiber that performs optical transmission between the semiconductor laser and the fiber laser medium.

5. The ultraviolet laser apparatus according to claim 1, further comprising:
a ferrule attached to an end of the fiber laser medium; and
a housing that accommodates the fiber laser medium and supports the fiber laser medium with the ferrule, wherein each of the housing and the ferrule is composed of a metal material with a first thermal expansion coefficient that is either equal to or has a predetermined difference from a second thermal expansion coefficient of a raw material of the fiber laser medium.

6. The ultraviolet laser apparatus according to claim 1, wherein the ultraviolet laser apparatus generates an ultraviolet laser light with a wavelength of 320 nm or less.

* * * * *